(12) United States Patent  (10) Patent No.: US 8,294,574 B2
Haywood  (45) Date of Patent: Oct. 23, 2012

(54) SECURITY DEVICE COMPRISING A PLURALITY OF INTERFACES

(75) Inventor: Helen Theresa Haywood, Norwich (GB)

(73) Assignee: Helen Theresa Haywood, Haddiscoe, Norwich (GB)

( * ) Notice: Subject to any disclaimer, the term of this patent is extended or adjusted under 35 U.S.C. 154(b) by 466 days.

(21) Appl. No.: 12/281,962

(22) PCT Filed: Mar. 7, 2007

(86) PCT No.: PCT/GB2007/000795
§ 371 (c)(1),
(2), (4) Date: Sep. 5, 2008

(87) PCT Pub. No.: WO2007/102001
PCT Pub. Date: Sep. 13, 2007

(65) Prior Publication Data
US 2009/0072988 A1  Mar. 19, 2009

(30) Foreign Application Priority Data

Mar. 7, 2006  (GB) .................................. 0604559.5

(51) Int. Cl.
*G08B 21/00* (2006.01)
*H04M 1/00* (2006.01)
(52) U.S. Cl. ........................................ 340/540; 379/159
(58) Field of Classification Search ................. 340/5.84, 340/539.11, 686.4, 540, 541, 539.14, 539.16, 340/286.01, 542; 379/159, 15, 157, 164, 379/170, 171, 37, 38
See application file for complete search history.

(56) References Cited

U.S. PATENT DOCUMENTS

| | | | |
|---|---|---|---|
| 4,651,144 A * | 3/1987 | Pagano | 340/693.8 |
| 4,764,953 A | 8/1988 | Chern et al. | |
| 5,303,300 A * | 4/1994 | Eckstein | 379/102.06 |
| 5,321,742 A * | 6/1994 | Stevens | 379/102.06 |
| 5,673,016 A * | 9/1997 | Lutes | 340/326 |
| 5,966,432 A | 10/1999 | Buckler et al. | |
| 5,987,318 A * | 11/1999 | Alperovich et al. | 455/416 |
| 6,173,259 B1 * | 1/2001 | Bijl et al. | 704/235 |
| 7,123,142 B2 * | 10/2006 | Bohbot et al. | 340/539.14 |
| 7,339,607 B2 * | 3/2008 | Damabhorn | 348/143 |
| 7,376,244 B2 * | 5/2008 | Baer | 382/103 |
| 7,397,674 B2 * | 7/2008 | Schlack | 361/801 |
| 7,571,393 B2 * | 8/2009 | Premchandran et al. | 715/767 |
| 7,623,640 B2 * | 11/2009 | Lee | 379/167.02 |

(Continued)

FOREIGN PATENT DOCUMENTS

CA  2061616  8/1993

(Continued)

*Primary Examiner* — Benjamin C Lee
*Assistant Examiner* — Sigmund Tang
(74) *Attorney, Agent, or Firm* — Sheppard Mullin Richter & Hampton LLP (57) ABSTRACT

A security device comprising interfacing means incorporating a speaker (50) and a microphone (49) for interfacing with a person; a mobile network transmitter; an internet communication means; a controller which automatically responds to interaction with said interfacing means and firstly employs said mobile network transmitter to dial one or more predetermined phone numbers through a mobile network for directly establishing a two way communication across the mobile network; wherein said controller secondly employs said internet communication means for transmission through the internet of data captured by said interfacing means.

43 Claims, 4 Drawing Sheets

U.S. PATENT DOCUMENTS

| | | | |
|---|---|---|---|
| 7,697,674 B2 * | 4/2010 | Nassimi | 379/167.02 |
| 7,844,295 B1 * | 11/2010 | Ngan | 455/552.1 |
| 7,859,561 B2 * | 12/2010 | Wang et al. | 348/14.08 |
| 2003/0013503 A1 * | 1/2003 | Menard et al. | 455/569 |
| 2004/0080413 A1 | 4/2004 | Lee | |
| 2004/0135686 A1 | 7/2004 | Parker | |
| 2005/0073425 A1 | 4/2005 | Snell et al. | |
| 2005/0285734 A1 * | 12/2005 | Sheynman et al. | 340/539.21 |
| 2008/0095350 A1 * | 4/2008 | Holt et al. | 379/211.02 |
| 2008/0180213 A1 * | 7/2008 | Flax | 340/5.84 |

FOREIGN PATENT DOCUMENTS

| | | |
|---|---|---|
| GB | 2 285 365 A1 | 7/1995 |
| GB | 2 354 394 A1 | 3/2001 |
| GB | 2 387 501 A1 | 10/2003 |
| GB | 2 400 958 A1 | 10/2004 |
| JP | 10-107912 | 4/1998 |
| WO | WO 01/01363 A1 | 1/2001 |
| WO | WO 02/061706 A1 | 8/2002 |
| WO | WO 02/085019 A1 | 10/2002 |
| WO | WO 03/028375 A1 | 4/2003 |

* cited by examiner

SECURITY DEVICE COMPRISING A PLURALITY OF INTERFACES

FIELD OF THE INVENTION

The present invention relates to security devices and in particular to security devices for use at the entrances to buildings.

PRIOR ART KNOWN TO THE APPLICANT

Intercom units are commonly used as security devices to control the entrance of people to buildings such as flats, offices, homes or similar premises. A person seeking to gain entrance to the building presses a button such that a buzzer rings in the relevant premises. An occupant in the building uses the intercom to determine whether to allow access to the building to the person by releasing an electronic lock on the main entrance door to the building. Such systems may additionally incorporate the use of cameras to allow the occupant of the premises to see the person at the entrance. The problem with this type of system is that in the event that the pressing of the button is not answered, the person seeking to gain access to the building, who may be a burglar or the like, may be alerted to the fact that the relevant premises are unoccupied. Such systems may also be used to control access through gates to enclosed areas.

Commercial security devices are also known which comprise a camera used to monitor an area, which may comprise an entry to a building or enclosed area, wherein the approach of a first person to the entrance is transmitted to a remote location where the camera images are monitored and/or recorded on a 24 hour a day basis. Intercom facilities may be provided between the monitored area and the remote location, in order for a second person monitoring the area to communicate with first person in the monitored area. The problem with this type of system is that such systems utilise broadband technology or alternatively radio communication and rely on the camera images being monitored, or at least recorded, 24 hours a day. Such systems are therefore expensive to install, monitor and maintain.

The following prior art are acknowledged:
US2004/135686A1
GB2285365A
GB2400958A
GB2354394A
U.S. Pat. No. 5,966,432A
US2004/080413A1
CA2061616A
U.S. Pat. No. 4,764,953A
JP10107912A
GB2387501A
WO 03/028375A1
WO 01/01363A1

SUMMARY OF THE INVENTION

In its first broad independent aspect, the invention provides a security device comprising:
  interfacing means incorporating a speaker and a microphone for interfacing with a person;
  a mobile network transmitter;
  an internet communication means;
  a controller which automatically responds to interaction with said interfacing means and firstly employs said mobile network transmitter to dial one or more predetermined phone numbers through a mobile network for directly establishing a two way communication across the mobile network;
  wherein said controller secondly employs said internet communication means for transmission through the internet of data captured by said interfacing means.

In a subsidiary aspect in accordance with the invention's first broad independent aspect, said security device further comprising means for translating between audio signals and a mobile text message.

In a further subsidiary aspect, said security device wherein said means for translating translate a mobile text message into audio signals for sounding by said speaker.

In a further subsidiary aspect said security device wherein said means for translating translate received audio signals captured by said microphone into a mobile text message.

In a further subsidiary aspect, said security device wherein said controller employs internet communication means in communication with a remote web location for storing and retrieving data captured by said interfacing means.

In a further subsidiary aspect, said security device according to any of the preceding claims, further comprising a Subscriber Identity Module (SIM) port for receiving a dedicated network module.

In a further subsidiary aspect, said security device wherein said SIM incorporates a key and said device incorporates a key in order to lock said SIM for operation with said device.

In a further subsidiary aspect, said security device further comprising means for interacting with an alarm; whereby a person remotely triggers an alarm through the mobile network communication.

In a further subsidiary aspect, said security device further comprising a security means which opens the communication with said interface means upon receipt of a communication with a predetermined authorisation code from a remote person.

In a further subsidiary aspect, said security device further comprising an audio storage means.

In a further subsidiary aspect, said security device further comprising one or more ports for attachment of one or more peripheral modules.

In a further subsidiary aspect, said security device wherein said peripheral module is a wireless local area network module.

In a further subsidiary aspect, said security device wherein said peripheral module communicates with one or more remote cameras.

In a further subsidiary aspect, said security device wherein said peripheral module communicates with one or more remote illumination means.

In a further subsidiary aspect, said security device wherein said peripheral module is a removable memory store.

In a further subsidiary aspect, said security device further comprising a number of detection means such as proximity sensors and a memory storing a number of predetermined short messages corresponding to the triggering of an individual detection means and means to transmit said short message to a remote person to inform said person that a detection means has been triggered.

In a further subsidiary aspect, said security device further comprising a camera and means to locally store visual data without any means being provided to transmit said visual data through said mobile network.

In a further subsidiary aspect, said security device further comprising a switch wherein the approach of a person to the remote unit activates illumination means to illuminate said switch.

In a further subsidiary aspect, said security device according to any of the preceding claims, further comprising a camera and lighting means; wherein when the camera is activated said lighting means illuminate selected areas.

In its second broad independent aspect, the invention provides a security device comprising: a remote unit and a base unit wherein; the remote unit comprises: a manually activated switch, a speaker, a microphone and communications means to communicate with the base unit; and the base unit comprises: communication means to communicate with the remote unit and means to dial one or more telephone numbers; characterised in that activation of the switch activates the dialling of one or more telephones by the base unit, such that communication is enabled between the remote unit and a dialled telephone.

In a subsidiary aspect in accordance with the invention's second broad independent aspect, said remote unit is linked to a person via a telephone line only when the remote unit is manually activated. Typically the unit will be located at the entrance to a building or other suitable location, such that a first person activating the switch is unable to determine whether the second person answering the telephone is within the premises or at a remote location.

In a further subsidiary aspect, the said switch activates a camera. In this way a record may be maintained of all persons activating the switch, which may be of use later in identifying persons who may have undertaken unauthorised or illegal acts in or around the premises concerned.

In a further subsidiary aspect, image(s) collected by said camera is/are stored by the base unit. Storing the pictures in this way means that even if the remote unit is vandalised the images taken by the camera are retained.

In a further subsidiary aspect, said camera is activated by an automatic mechanism prior to the activation of the switch. This enables pictures to be taken of persons as they approach a door or an entrance even if they do not activate the manually activated switch.

In a further subsidiary aspect, the approach of a person to the said remote unit activates illumination means to illuminate the switch. The illumination of the switch in such a way encourages people approaching the door or entrance to press the button rather than knock on the door.

In a further subsidiary aspect, said camera is activated by a separate proximity detector. The use of such proximity detectors enables the device to photograph intruders or visitors in the general area around the remote unit, for instance if the remote unit is mounted on a building entrance the camera may be able to photograph intruders in gardens or walkways immediately surrounding the building entrance by the use of remote proximity detectors.

In a further subsidiary aspect, said remote unit is situated in a car, an office, a garage, or the like and is activated by unauthorised entry. Thus the unit may be used as an alarm system to warn a person when said car, office, garage or the like—has been/is being—broken into.

In a further subsidiary aspect, a video link is provided between said remote unit and the dialled telephone. The provision of a video link, may be in the form of a mobile network, which incorporates second (2G), third (3G), fourth (4G) and/or future generations of mobile technology platforms, which enables face to face communication between a person activating the switch of the remote unit and a person with whom communication is enabled via the dialled telephone.

In a further subsidiary aspect, activation of said base unit or said camera activates lighting means to illuminate selected areas. The activation of lighting means, which illuminates selected areas, enables the camera to take superior quality images at night than would otherwise be possible and additionally helps to generally deter intruders.

In a further subsidiary aspect, if the dialled telephone is not answered, is engaged, or is answered by an answering machine said base unit dials the next number from a list of pre-programmed telephone numbers. Means may be provided such that, if the first dialled telephone is not answered, or is engaged, or is answered by an answering machine, subsequent telephone numbers may be dialled from a pre-programmed list in a pre-programmed order to ensure that activation of the manual switch is responded to by a person contacted by the base unit telephone using a telephone connection.

In a further subsidiary aspect, said base unit awaits the entry of a code or signal from selected dialled telephones before connecting the remote unit to the dialled telephone. Such a feature may be useful where the telephone number dialled may be answered by an answering machine, the use of said answering machine not being detectable by the base unit, the remote unit may be programmed to await the entrance of a suitable signal or code (i.e. the pressing of the # key) before communication is established between the remote unit and the dialled telephone. Thus the first person manually activating the switch is not alerted to the fact that the remote unit is establishing contact to a second person by telephone.

In a further subsidiary aspect, if the code or signal is not received within a pre-set time interval the base unit disconnects the call and calls the next telephone in a pre-set list. In this way the activation of the manual switch by a first person results in a second or further telephone number being dialled until a second person is contacted who can speak with the first person.

In a further subsidiary aspect, said security device substantially as hereinbefore described with reference to and/or illustrated in any appropriate combination of the accompanying text and/or figures.

BRIEF DESCRIPTION OF THE DRAWINGS

The invention will be described by reference to accompanying drawings in which.

SPECIFIC DESCRIPTION OF THE PREFERRED EMBODIMENT(S)

The present invention comprises a remote unit and a base unit as described herein.

Figure 1:
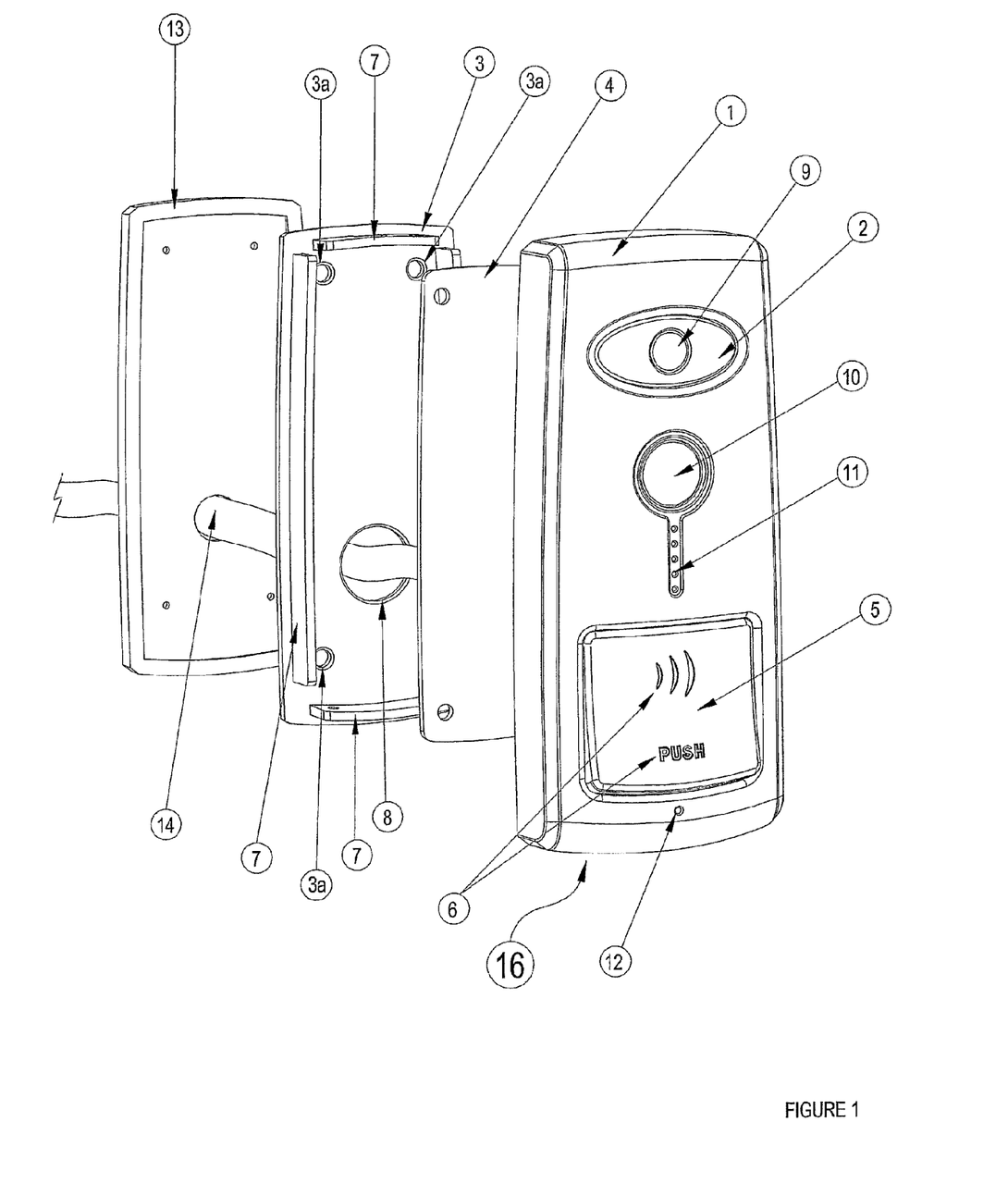
FIG. 1 is a partially exploded perspective view of a remote unit according to the one embodiment of the present invention.

Reference is initially made to FIG. 1 of the drawings which shows a partially exploded perspective view of a remote unit according to the present invention as generally indicated by (16). The remote unit comprises four separate basic components, which are shown in FIG. 1 these comprise a steel chassis (3), a circuit board (4) (which also functions as a sub-frame), a plastic moulding (1) and a seal 13.

Appropriate holes (3a) are provided in the steel chassis (3), to enable the steel chassis (3) to be mounted to a door frame or a suitable surface (such that the device may be used as an entrance monitoring device) by the use of screws (not shown), three of the four holes (3a) provided are shown on FIG. 1.

An orifice (8) is also provided in the steel chassis (3) to allow the passage of cables (14) through the chassis (3). Said cables may be used to connect the remote unit to the base unit and/or to supply power to the remote unit (16).

A series of protruding sections (7) are provided in the steel chassis, such protrusions may act as means to ensure that plastic moulding and circuit board are correctly located relative to the steel chassis (3), when the separate components (1), (3) and (4) of the remote unit are assembled to form a single unit. Alternatively the protrusions may act to ensure that a rubber seal (not shown), used to weather-proof the assembled unit (16), is maintained in an appropriate orientation with respect to the plastic moulding (1) and the steel chassis (3) during assembly of the remote unit (16). When the protruding sections (7) form a guide for such a seal (not shown), the seal is initially positioned around the raised protrusions (7) prior to the circuit board (4) and plastic moulding being positioned in the appropriate location relative to the steel chassis (3).

The circuit board (4) serves as a sub-frame onto which all of the electronic components such as the camera, speaker, microphone, etc. may be mounted, the circuit board (4) itself being mounted in the plastic moulding (1).

A number of components are incorporated into the front face of the plastic moulding (1) these comprise a plastic lens cover (2), a camera lens (9), a detector (10) which may be an ultrasonic detector, a passive infrared detector, or other such suitable detector of a type that would be known to the skilled addressee, a speaker (11), a manually activated switch (5) and a microphone (12).

The manually activated switch (5) is mounted into the plastic moulding in such a way that it operates as a rocker switch. A light emitting diode (LED) (not shown) is mounted within the switch (5) in order to illuminate the switch from within, the LED being connected to the circuit board (4). The switch (5) furthermore incorporates portions, which are manufactured from clear plastic as indicated by (6).

The remote unit (16) may also be weather proofed (i.e. protected from water damage) by coating the internal computer or the unit as a whole with suitable waterproofing materials in the form of sprays or dips. Any clearance space between the switch and the plastic moulding (1) may also be weather proofed by means of a second seal (not shown).

Figure 2:
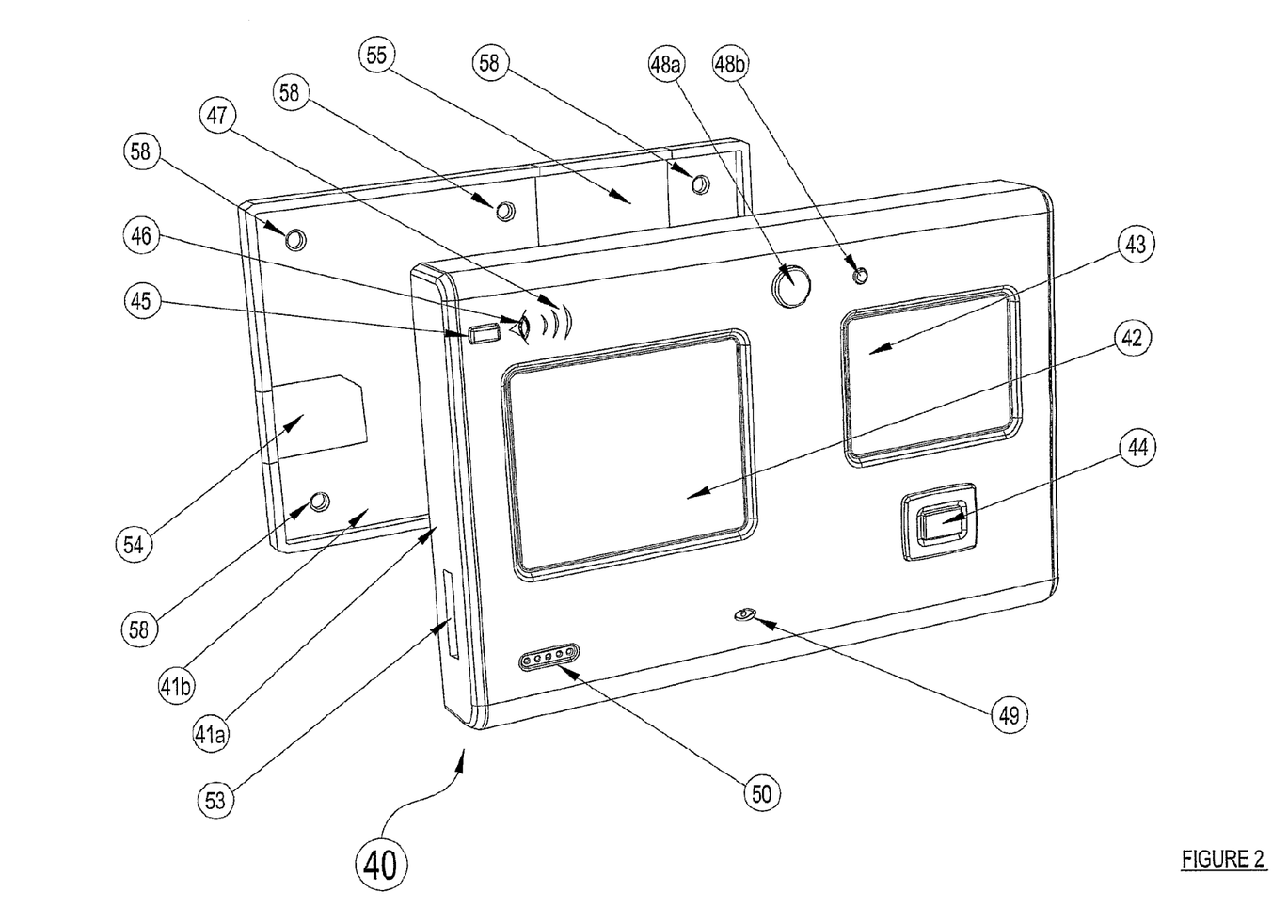
FIG. 2 is a partially exploded perspective view of a base unit according to one embodiment of the present invention.
Figure 3:
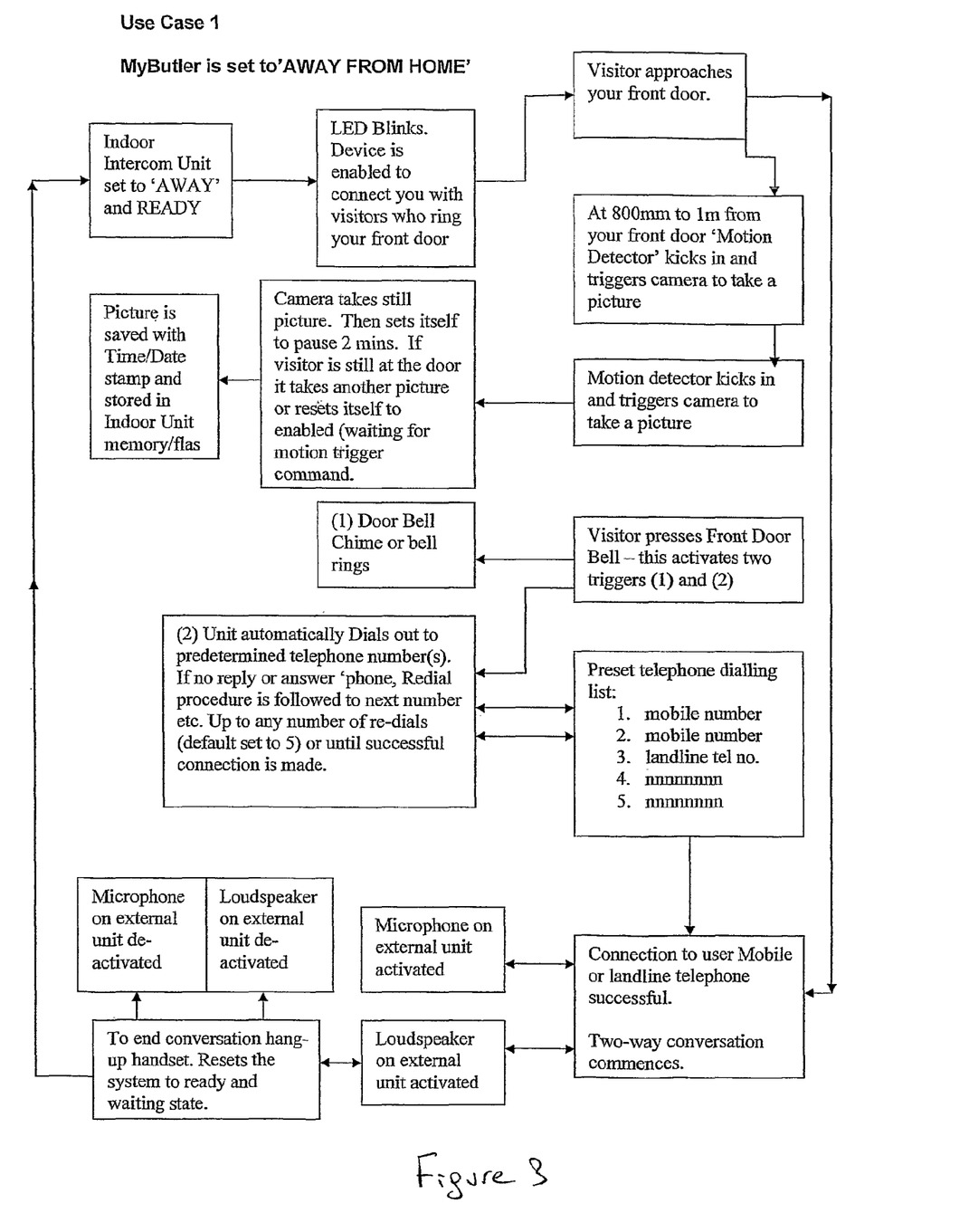
FIG. 3 is a block flow diagram indicating potential modes of operation of the security device, with the device set to "AWAY FROM HOME".
Figure 4:
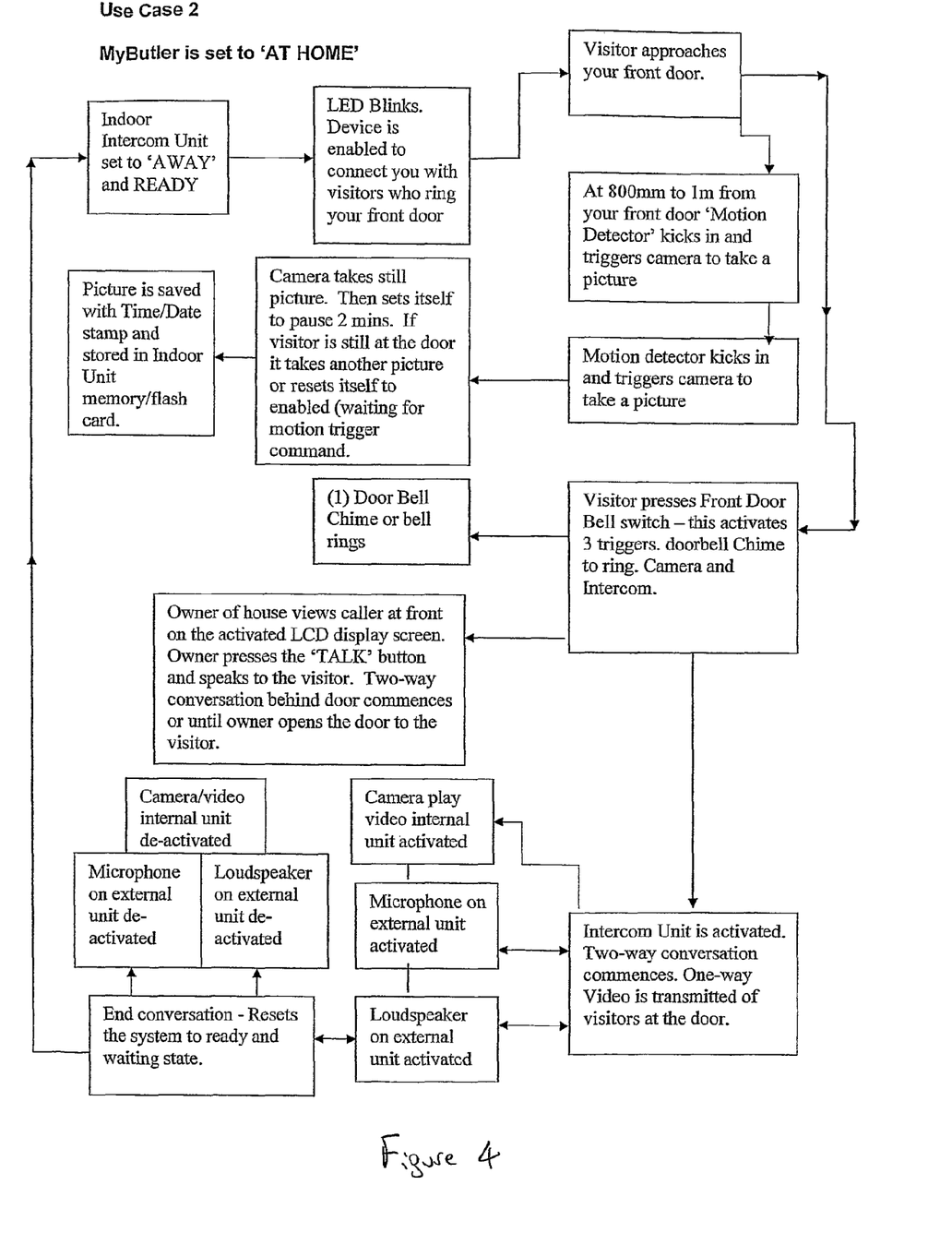
FIG. 4 is a block flow diagram indicating potential modes of operation of the security device, with the device set to "AT HOME".

Reference will now be made to FIG. 2 of the drawings, wherein a partially exploded perspective view of the base unit as generally indicated by (40) is shown.

The base unit (40) includes a housing formed in two parts (41a and 41b), the two parts being manufactured from plastics material or the like.

The rear part (41b) of the housing includes two keyhole shaped slots (not shown) to allow the unit to be mounted on a wall, or other suitable surface, by the use of screws—other suitable fixing means may also be used.

The rear part of the housing (41b) is secured to the front of the moulding (41a) by the use of six screws which insert into openings (58) in the rear housing (41b), only four of the six openings are shown, and insert into corresponding portions in the front housing (41a).

Alternative means such as push clip mechanisms, or similar fixing means—as would be known to the skilled addressee—may be use to connect the front housing (41a) to the rear housing (41b).

The rear part of the housing (41b) further incorporates a removable door (54) to allow the insertion of a SIM card into the device (if appropriate) and a second removable door (55) is provided to allow the insertion and replacement of batteries. Further doors (not shown) may be provided in the rear part of the housing to allow the insertion of a plug socket for mains power supply, and/or a plug socket to connect the device to a remote monitor and/or a plug socket to connect the device to a fixed telephone line.

The front part of the housing (41a) provides a slot 53 for the insertion of a smart card and also incorporates a screen (LCD or the like) to display images collected by the camera of the remote unit. Also provided are a keyboard (43) and joystick (44) to allow a user to access menus to control the set-up of the device and to allow the entry of relevant data such as telephone numbers.

A power switch (45) is provided together with a power indicator light (46). A low battery/alarm function (47) provides a warning to user of the device when the batteries need replacing.

A switch in the form of a button (48a) is provided to allow the base unit to be used as a standard intercom and an indicator (48b) in the form of an LED is provided to indicate that the button has been pressed sufficiently hard to activate the intercom.

A microphone (49) and speaker (50) are also incorporated into the front part of the housing (41a) to allow communication between the base unit (30) and the remote unit (16).

All necessary electronic components including circuit boards and aerials are incorporated into the front part of the housing (41a).

In use a person approaching the remote unit (16) is detected by the detector (10) which activates the camera such that one or more photographs are taken and/or alternatively the approach of the person is recorded as a video image. The picture(s)/video images being saved remotely from the remote unit, either by suitable means provided in the base unit or by alternative suitable data storage means, such that if the remote unit is vandalised or stolen the images are retained. The number of photographs to be taken and/or length of time for which video images are to be recorded may be preset by a user via the base unit. The photographs or video images may be subsequently viewed using the screen (42).

The detection of a person by the detector (10) also activates the LED which illuminates the switch (5) such that the approaching persons attention is automatically drawn to the switch (5) to encourage use of the switch (5). The LED is set to automatically switch off after a pre-set interval of time which may range from a few seconds to several minutes.

If the person presses the switch (5) then the base unit may activate the production of an audible alarm signal by the remote unit. Such that the person pressing the switch (5) is led to believe that the switch activates a standard door bell type mechanism. A second person, within the premises, hearing the audible alarm signal may then use the base unit (40) as a standard intercom by pressing the button (48a) to establish audio communication between the remote unit (16) and the base unit (40). The screen (42) may be used to display images from the camera of the remote unit (16) during such communication.

When a second person is not available within the premises to use the base unit (40) as a standard intercom the base unit (40) may be manually set to dial a series of pre-programmed telephone numbers in a pre-determined order. In this way a second person answering a dialled telephone may communicate with the first person via the base unit (40) and remote unit (16). Alternatively the base unit (40) may automatically start the dialling of the relevant telephone number if the button (48a) is not pressed within a pre-determined time interval from the activation of the switch (5).

Once the second person, answering a dialled telephone hangs up the telephone connection established by the base unit is automatically disconnected.

In this way a first person activating the switch is not able to determine whether the second person with whom they communicate is within premises entered by an entryway adjacent the remote unit or is at a remote location. Thus the base unit (40) and remote unit (16) act as a security device dissuading a first person from illegally entering the premises concerned.

The base unit may utilise a standard land line or may use a mobile telephone connection to dial the relevant telephone numbers.

Smart cards used with the base unit may provide a medium for the storage of images, such images may also be stored on storage devices provided separately from the base unit (40) and remote unit (16).

Alternatively the smart card may be a pre-payment card of the type used with 'Pay as You Go' type mobile phones if the base unit utilises a mobile phone as the primary means for dialling other telephones, or as backup in the event that the land line used as a primary telephone connection fails to function properly.

In the particular embodiment described above the communication between the first person via the remote unit and a second person called on a telephone would normally be voice to voice, although alternative means could be utilised such as 3G technology to enable the second person called on a telephone to view images collected by the camera. Alternatively a screen may be incorporated into the remote unit to allow video to video communication between the remote unit and the base unit, or between the remote unit and a second person called on a telephone.

Means may be provided to provide automatic transmission of photographs or video images taken by the camera to a dialled telephone even if the switch (5) is not activated.

Communication between the base unit (40) and the remote unit (16) may be via cable, Bluetooth connection, or any other form of suitable communication means as would be known to the skilled addressee.

The activation of the security device disclosed herein may be prevented without the insertion of an appropriately coded SIM card, even if the device is utilising a landline rather than a mobile connection. The SIM card may also allow the activation of the device to be remotely controlled by the supplier of the SIM or by the supplier of the telephone connection or by the original equipment manufacturer (OEM).

In summary special advantages provided by the present invention are:

A security device for monitoring an entrance door to any building, for example home, office, garage etc.
A security monitoring device for monitoring cars or any other valuable items.
A security monitoring device with real time interaction, allowing two-way conversation.
A security monitoring device that is activated by the approach and/or operation of a 'door bell' type switch.
A security monitoring device that connects its owner to a visitor anywhere in the world via telephonic communication.
A security monitoring device that photographs potential visitors on approach.
A security monitoring device that utilises second (2G), third (3G), fourth (4G) and/or future generations of mobile technology platforms.
A security monitoring device that is able to connect directly to second (2G), third (3G), fourth (4G) and/or future generations of mobile technology platforms.
A security monitoring device that is able to connect directly to land lines.
A security monitoring device wherein a remote 'bell push' activates a telephone dial out mechanism.
A security monitoring device wherein further triggers can be remotely placed for example at an entrance gate for activating photographic or video recording means.

The present invention therefore enables homeowners and the like, who are away from their premises to interact with visitors calling at their premises. Known surveillance and home security systems monitor intrusive activity to the home or office, but do not include instant two-way interaction with the owner of the premises.

The real time interaction between the visitor and the owner of the property are ensured at all times, whether the owner is indoors or away from their property. The mobile network allows communications connection on a global platform. This means that the owner can be abroad and still be connected by voice or video to callers/visitors to their property. Preferably, the unit will be small enough to house all the electronic components and will fit all standard external door-frame widths.

The present invention may also be used to control access through gates to enclosed areas.

Additionally known means may be provided to allow the device to be accessed remotely to; re-order the sequence in which the telephone numbers are dialled, to access images stored by the system, or to re-set the system if required.

When a dialled telephone is answered the use of a code entry may also be required to ensure that communication between the remote unit and the second person on the dialled telephone is not established before the second person is ready to communicate with the first person.

In a further embodiment of the security device, the remote unit and/or base unit incorporates a power supply unit, which does not incorporate any external wires, connectors or contacts. This may be in a typical form, such as an inductive coupling, which induces power into an inductive receiver, within the remote unit and/or base unit. The induced power is a magnetic field, transmitted from a typical charging pad. The charging pad may be located on or in the immediate vicinity of the remote unit and/or base unit.

In a further embodiment of the security device, the remote unit and/or base unit incorporates an additional key pad, display screen and speech recognition circuitry. These components are required for establishing two way communication with a person who is deaf. The visitor will activate the remote unit by pressing a switch and speaking into the remote unit's microphone. The visitor's speech is then converted into a textual representation, by the speech recognition circuitry, which is then communicated onto a display screen that is mounted internally in the house and/or transmitted to a mobile phone, which can be read by a person who is deaf. The deaf person will respond to the visitor's communication by entering textual response from either a keypad located internally within the house, or from a mobile phone. The textual response entered will then be converted into speech, by the speech recognition circuitry, which is then transmitted to the visitor.

This embodiment may be further enhanced by incorporating a touch screen display within the remote unit and/or base unit. A keypad may be incorporated within the touch screen. The touch screen will display a menu to the visitor, which offers "one touch" selection and communication means to visited person.

In a further embodiment of the security device, unique access codes are stored within the remote unit and/or base unit. The access codes are assigned to authorised person(s), to give them immediate access to the property. On entering the code the person is identified, the security device's camera will capture an image of the visitor, along with the time of the visit. A text message is then sent to the property owner's mobile phone, informing them of the identity of the visitor and at what time they gained access to the property.

In a further embodiment of the security device, the visitor may speak into remote unit's microphone to leave a message, which will be stored in the security device's remote unit and/or base unit. The security device will capture an image of the visitor, as well as the audio message, when the visitor activates an intercom/doorbell switch and/or movement sensor(s).

This embodiment may be further enhanced by incorporating biometric scanning devices to the remote unit and/or base unit. The biometric scans of authorised person(s) are stored within the remote unit and/or base unit, to give them immediate access to the property. On entering the biometric scan, typically a fingerprint, handprint or retina scan, the person is identified. The security device's camera will capture an image of the visitor, along with the time of the visit. A text message is then sent to the property owner's mobile phone, informing them of the identity of the visitor and at what time they gained access to the property.

In a further embodiment of the security device, the remote unit and/or base unit incorporates an additional Braille keypad, Braille intercom/doorbell switch and a sounding device. These components are required for establishing two way communication with a person who is blind. A blind visitor will be guided to the remote unit, by a sounding device located in close proximity to the remote unit. The sounding device will be activated by the activation of a movement detector located in close proximity to the remote unit. Once the blind visitor has located the remote unit, they can determine the functionality of the keys on the keypad and/or intercom/doorbell switch, by feeling the Braille text located upon the components. Therefore, audio, visual and/or textual communication is established to the inside of the house and/or transmitted to a mobile phone.

In a further embodiment of the security device, predetermined text messages are stored within the remote unit and/or base unit. These text messages are assigned to activations of the security device, which are dependent upon an array of discrete sensors. Each discrete sensor is mapped to an individual function. For example, a sensor monitoring a zone within the garden, a sensor monitoring a zone within the garage and/or a sensor monitoring a particular door or window. Therefore, when a sensor is activated, i.e. a sensor located within a garage, the security device will transmit a text message across the mobile network and/or internet, to the house owner's mobile phone, informing them of a potential security threat to their garage.

This embodiment may be further enhanced by incorporating a means for remotely operating an illumination device(s), audible device(s), slave camera(s) and/or any other remote devices, by entering predetermined codes from the house owner's mobile phone, which are then transmitted across the mobile network and/or internet to the security device.

This embodiment may be further enhanced by incorporating one or more docking ports for the insertion of a removable wireless network transceiver module, typically a Universal Serial Bus (USB) "Bluetooth"® or "IEEE 802.11" wireless network modules. Therefore, all remote sensors, remote cameras and/or remote units are wirelessly networked to the security device.

In a further embodiment of the security device, all activations are time stamped and logged within the remote unit and/or base unit, for inspection and retrieval at a later time. This embodiment may be further enhanced by incorporating one or more docking port for the insertion of a removable memory module, typically a Universal Serial Bus (USB) memory device. This device may be used for dumping and backing up the security device's activation data log and/or stored security data.

In a further embodiment of the security device, the data obtained is transmitted across a mobile network and/or the internet to a dedicated gallery domain, which resides on the World Wide Web. This gallery provides an access means to the security data stored for a particular security device. The gallery will manage the retrieval and use of the data. Typically the gallery provides a means for remotely accessing and responding to the stored data from places abroad.

In a further embodiment of the security device, the remote unit and/or base unit incorporates an additional alarm device. This may typically be an audio and/or visual alarm device. The property owner may activate the alarm by pressing a predetermined button or switch on the base unit or by transmitting a code, entered from their mobile phone, across a mobile network and/or internet to activate the alarm remotely.

This embodiment may be further enhanced by incorporating an interface means which connects the security device to an existing alarm system within the property. The property owner may activate the alarm by pressing a predetermined button or switch on the base unit or by transmitting a code, entered from their mobile phone, across a mobile network and/or internet to activate the alarm remotely.

In a further embodiment of the security device, the remote unit and/or base unit incorporates a Subscriber Identity Module (SIM), for authentication of mobile network connection. The owner of the security device may enter into a service contract with a mobile network provider. The network provider will issue a dedicated SIM for the security device, enabling it to connect to the mobile network. The security device owner may after the contract term has expired, renegotiate a service with another mobile network provider, who will then issue their own dedicated SIM, which supersedes any existing SIM within the security device. The SIM is intended to be a static device, and not a roaming device, like a conventional SIM for a mobile phone. Therefore, a fixed address is established for billing. The dedicated SIM for the security device, will generate additional revenue streams for the mobile network companies. The revenue streams comprise offering new fixed term contracts between customers and network providers for security services. The new fixed term contracts will typically provide, for each customer account, a SIM, a new dedicated number for the security device and a range of air time tariffs for the security device.

The security device in combination with its dedicated SIM, will maintain the integrity of the mobile network connection, data verification checks and enable the authorisation of the security device to connect with the mobile network in response to any network challenges to the SIM's authenticity.

The mobile network provider may monitor the actual location of the SIM by establishing its position via the cells within the mobile network. If the SIM is shown to be roaming, then the mobile network provider has the option of disabling the SIM and informing the security device owner of the potential security risk.

In a further embodiment of the security device, the remote unit and/or base unit may be incorporated as static devices, within a non-static platform. These platforms are typically land vehicles, floating vehicles and/or airborne vehicles. The remote unit and/or base unit incorporate additional Global Positioning System (GPS) circuitry. These components are required for transmitting GPS coordinates across the mobile network and/or internet via a wireless internet connection, to update the present location of the platform. This embodiment will enable successful tracking of the platform, in the event of it being stolen or misused.

The remote unit and/or base unit incorporated within the platform will record any instances which trigger any activation from sensors within the platform and/or any remote activation from platform owner, police enforcement departments or contracted security companies. The security data obtained may be used as potential evidence, later at any subsequent legal proceedings. The remote unit and/or base unit incorporated within the platform will enable two-way communication between the platform owner and the people being monitored within the platform.

This embodiment may be further enhanced by connecting the security device to the control and/or management systems of the platform. Therefore enabling the platform owner, police enforcement departments or contracted security companies to remotely shutdown and immobilise the platform. The platform may engage locks, which have been activated remotely to contain the people being monitored within the platform.

In a further embodiment of the security device, the remote unit and/or base unit may be used to monitor a specific area. The security device transmits over a mobile network and/or the internet, audio and visual data, which establishes communication between a property owner, law enforce department or private security company and any person(s) monitored within the area. Once communication has been established, the persons(s) monitored by the security device are informed, typically by a loudspeaker, that they are being monitored. The security data obtained may be used as potential evidence, later at any subsequent legal proceedings.

In a further embodiment of the security device, the security device functionality maybe incorporated into an integrated single unit to reduce the security devices physical size, i.e. for miniaturisation of the security device for new applications.

This embodiment may be further enhanced by incorporating the security device into a portable computer, typically a laptop, notebook or Personal Digital Assistant (PDA). Therefore, if a portable computer or PDA is stolen, and the thief attempts to use it without deactivating the security device first. The computer or PDA will capture an image of the thief and transmit it across a mobile network and/or the internet to the owner's mobile phone and/or predetermined web domain. The laptop or PDA will then deactivate itself, typically going into a sleep state and disenable any user interface. The laptop or PDA will then permanently display a message onto the screen, i.e. "THIS DEVICE HAS BEEN STOLEN AND IS CURRENTLY TRANSMITTING A TRACKING SIGNAL", and/or activate a loud audible alarm.

This embodiment may be further enhanced by incorporating the security device into children's jewelry, typically bangles and/or necklaces, which captures images of who they are with and with whom they have been. This embodiment may be used to provide security for a child.

This embodiment maybe further enhanced by utilising the security device as a data logging device, which depicts the child's life from when they were a young child to adulthood, as a historic gallery of images.

This embodiment maybe further enhanced by incorporating the security device into clothing. Therefore, when going on holidays it captures images on a regular basis of what you did, where you were and what you were doing. This embodiment embeds all the required functionality, to capture the images, within the clothing. This embodiment eliminates the need to operate a camcorder or camera. Therefore, this embodiment may be advantageous for work practices, when the wearer's clothing captures images of the processes performed by the wearer.

In a further embodiment of the security device, the security device's activation will be triggered by a sharp, snatched movement. Therefore, once the security device is activated an alarm will be generated, this may be typically in the form of an ear piercing alarm, or an audible circuitry playing in a set loop sounding i.e. "This is stolen property". A Personal Identification Number (PIN) will be required to be entered, into the security device, to turn it off. This embodiment may be used to secure handbags, brief cases, portable computers or anything else which is portable or valuable.

Further potential embodiments of the security device are as follows:

Fashion, particularly accessories such as handbags and wallets;
Back of jackets (in the neck or collar);
Back of a safe, which monitors those who are using it;
A computer screen, which monitors those who are using it and/or activating it by keystroke;
Doors and/or windows, which monitors those who are opening them;
Mobile phones, which monitors those who are using them;
Passports and ID documents;
Legal document folders;
Covert aircraft surveillance, where hatches that have been opened by ground staff are monitored, to capture who opened the hatch, who or what embarked or disembarked the aircraft via the hatch and what they were doing;
Passport control and/or immigration;
Road signs, which monitor traffic conditions;
Evolution of a process over a long period where you don't want continuous monitoring but want detailed data i.e. like a car journey;
Any weapons, munitions or storage devices, which capture the images of people who open them.

The invention claimed is:
1. A security device system comprising:
a premise entrance intercom system, comprising:
  interfacing means incorporating a speaker and a microphone for interfacing with a person; and
  a mobile network transmitter;
a base unit system located in the premise, comprising:
  a mobile internet communication means;
  a controller which automatically responds to interaction with said interfacing means via said mobile network transmitter to firstly activate a doorbell audible alarm and dial a series of predetermined phone numbers in a pre-determined order, the controller initiating the dialing simultaneously with the activation of the audible alarm, and the dialing facilitated by a mobile network for establishing a two way communication across the mobile network between the mobile network transmitter and a communication device associated with an answered dialed phone number;
  wherein said controller secondly employs said mobile internet communication means for transmission through the internet of video or multimedia data captured by said interfacing means to said communication device.

2. A security device system according to claim 1, further comprising means for translating between audio signals and a mobile text message.

3. A security device system according to claim 2, wherein said means for translating comprises translating a mobile text message into audio signals for sounding by said speaker.

4. A security device system according to claim 2, wherein said means for translating comprises translating received audio signals captured by said microphone into a mobile text message.

5. A security device system according to claim 1, wherein said controller employs said mobile internet communication means in communication with a remote web location for storing and retrieving data captured by said interfacing means.

6. A security device system according to claim 1, further comprising a Subscriber Identity Module (SIM) port for receiving a dedicated network module.

7. A security device system in accordance with claim 6, wherein said SIM incorporates a first key and said device system incorporates a corresponding second key in order to lock said SIM for operation with said device system.

8. A security device system in accordance with claim 1, further comprising means for interacting with an alarm; whereby a person remotely triggers an alarm through the mobile network communication.

9. A security device system in accordance with claim 1, further comprising a security means which opens the communication with said interface means upon receipt of a communication with a predetermined authorisation code from a remote person.

10. A security device system in accordance with claim 1, further comprising an audio storage means.

11. A security device system in accordance with claim 1, further comprising at least one port for attachment of at least one peripheral module.

12. A security device system in accordance with claim 11, wherein said at least one peripheral module is a wireless local area network module.

13. A security device system according to either of claims claim 11, wherein said at least one peripheral module communicates with at least one remote camera.

14. A security device system according to either of claims claim 11, wherein said at least one peripheral module communicates with at least one remote illumination means.

15. A security device system according to claim 11, wherein said at least one peripheral module is a removable memory store.

16. A security device system according to claim 1, further comprising a number of detection means such as proximity sensory and a memory storing a number of predetermined short messages corresponding to the triggering of an individual detection means and means to transmit said short message to a remote person to inform said person that a detection means has been triggered.

17. A security device system according to claim 1, further comprising a camera and means to locally store visual data without any means being provided to transmit said visual data through said mobile network.

18. A security device system according to claim 1, further comprising a switch wherein the approach of a person to the remote unit activates illumination means to illuminate said switch.

19. A security device system according to claim 1, further comprising a camera and lighting means; wherein when the camera is activated said lighting means illuminate selected areas.

20. A security system according to claim 16, wherein the number of detection means comprises proximity sensors.

21. An intercom security system, comprising:
a remote unit located at a premise entrance, comprising an interfacing means for interfacing with a person;
a base unit, comprising:
a status indicator for a switch indicating a first status or a second status, wherein the first status corresponds to an occupant being at the premise and the second status corresponds to an occupant being way from the premise;
a control module, coupled to the switch, configured to:
establish two-way communications with the base unit thereby activating a doorbell audible alarm responsive to the activation of the interfacing means by the person;
dial a series of telephone numbers in a predetermined order, the dialing initiated simultaneously with the activation of the audible alarm;
the switch, coupled to the control module, configured to generate a signal when activated;
wherein, in operation:
the switch generates the signal to indicate the first or second status based on a user setting;
the control module, in response to the signal, establishes two-way communications by the occupant of the premise with the person at the remote unit when the status indicator is associated with the first status;
the control module, in response to the signal, initiates dialing the series of telephone numbers in the predetermined order when the status indicator is associated with the second status to establish two-way communications by a dialed person with the person at the remote unit.

22. The remote unit of claim 21, further comprising:
A detector;
A camera coupled to the detector;
Wherein, in operation:
The detector detects a presence of the person;
The camera captures an image of the person when the presence of the person is detected.

23. The remote unit of claim 22, wherein the image is a first image, and wherein in operation the camera captures a second image at a time interval after the presence of the person is detected.

24. The remote unit of claim 22, wherein the image is saved with a timestamp.

25. The remote unit of claim 22, wherein the detector triggers an illumination unit when the presence of the person is detected.

26. The remote unit of claim 21, wherein the person is a first person, further comprising an authorisation access module configured to assign an access code to the first person and notify a second person of an identity of the first person.

27. The remote unit of claim 26, further comprising a camera to capture an image of the first person.

28. The remote unit of claim 26, wherein the authorization access module is further configured to notify the second person of the identity of the first person in a text messages.

29. The remote unit of claim 21, wherein the control module is operable to establish two-way communications between the person and a communications device associated with one of the series of telephone numbers.

30. The remote unit of claim 29, wherein the two-way communications between the person and the communications device comprises a text message.

31. The remote unit of claim 21, further comprising a microphone and a speaker, each of the microphone and the speaker to facilitate the two-way communications with the base unit.

32. The remote unit of claim 21, further comprising a video screen to facilitate the two-way communications with the base unit.

33. The remote unit of claim 21, further comprising speech recognition circuitry to facilitate the two-way communications with the base unit.

34. The remote unit of claim 21, wherein the control module initiates dialing the series of telephone numbers in the predetermined order when the signal associated with operation of the switch is not generated within a time interval after a detector detects the presence of a person.

35. The remote unit of claim 21, wherein the control unit uses an Internet connection to dial the series of telephone numbers.

36. The remote unit of claim 21, wherein the series of telephone numbers includes a mobile telephone number.

37. The remote unit of claim 21, further comprising a biometric scanning device to grant access based on biometric data of the person.

38. The remote unit of claim 21, further comprising a storage unit configured to activate art array of sensors, each of the array of sensors corresponding to a zone of a property to which access is restricted.

39. A method, comprising:
    detecting a presence of a first person at the entrance to a premise by a remote unit;
    capturing an image of the first person at the entrance by the remote unit;
    dialing, using a mobile network, a series of telephone numbers in a predetermined order responsive to the detected presence;
    establishing two-way Internet video communications between the first person and a communications device associated with one of the series of predetermined telephone numbers responsive to the dialing;
    establishing two-way video communications of the remote unit with a base unit, activating a doorbell audible alarm simultaneously with the initiation of the dialing of the series of telephone numbers;
    assigning an access code to the first person if the first person is authorized to pass through the entrance;
    notifying a second person that the first person has passed through the entrance.

40. The system of claim 1, wherein the two way communication comprises an Internet video communication.

41. The system of claim 21, wherein the two-way communications comprises an Internet video communication.

42. The system of claim 1, wherein the predetermined order comprises dialing one of the series of predetermined phone numbers simultaneously with dialing another of the series of phone numbers.

43. The system of claim 21, wherein the predetermined order comprises dialing one of the series of predetermined phone numbers simultaneously with dialing another of the series of phone numbers.

\* \* \* \* \*